(12) United States Patent
Yang

(10) Patent No.: US 11,849,444 B2
(45) Date of Patent: Dec. 19, 2023

(54) METHOD FOR PROCESSING DATA, COMMUNICATION DEVICE, AND STORAGE MEDIUM

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/784,553

(22) PCT Filed: Dec. 13, 2019

(86) PCT No.: PCT/CN2019/125224
§ 371 (c)(1),
(2) Date: Jun. 10, 2022

(87) PCT Pub. No.: WO2021/114244
PCT Pub. Date: Jun. 17, 2021

(65) Prior Publication Data
US 2023/0033637 A1 Feb. 2, 2023

(51) Int. Cl.
*H04W 72/1263* (2023.01)
*H04W 72/566* (2023.01)
(52) U.S. Cl.
CPC ..... *H04W 72/1263* (2013.01); *H04W 72/569* (2023.01)
(58) Field of Classification Search
CPC ........ G01S 13/765; G01S 5/0205; G01S 5/10; G01S 1/20; G01S 11/06; G01S 13/75;
(Continued)

(56) References Cited

U.S. PATENT DOCUMENTS 10,952,230 B1 * 3/2021 Pan ............... H04W 28/0268
2015/0071059 A1 * 3/2015 Fu ...................... H04L 47/2408
370/235
(Continued)

FOREIGN PATENT DOCUMENTS

| EP | 3051737 A1 | 8/2016 | |
| JP | 2019522430 A | 8/2019 | |
| WO | WO-2019198838 A1 * | 10/2019 | ........ H04W 28/0268 |

OTHER PUBLICATIONS

Indian Patent Application No. 202247039189, Office Action dated Oct. 13, 2022, 5 pages.
(Continued)

*Primary Examiner* — Nathan S Taylor
(74) *Attorney, Agent, or Firm* — COZEN O'CONNOR

(57) ABSTRACT

A method for processing data includes: determining a second UE based on logical channel priorities of logical channels corresponding to SL-DRBs and/or SL-SRBs of data to be transmitted; and determining a medium-access-control protocol data unit (MAC PDU) for transmitting to the second UE, in which the MAC PDU includes data to be transmitted in one or more sidelink radio bearers (SL-RBs) determined based on logical channel priorities of logical channels corresponding to SL-RBs of the second UE, and the SL-RBs of the second UE include SL-DRB(s) of the second UE and/or SL-SRB(s) of the second UE.

16 Claims, 7 Drawing Sheets

(58) Field of Classification Search
CPC .. G01S 13/76; G01S 5/02; G01S 5/06; H04W 56/009; H04W 64/003; H04W 64/006; H04W 56/00; H04W 64/00; H04W 24/02; H04W 24/10; H04W 4/02; H04W 4/33; H04W 88/00; H04W 52/0206; H04W 52/0212; H04W 52/0225; H04W 52/0251; H04W 52/0229; H04W 84/12; H04W 88/06; H04W 52/02; H04W 56/0045; H04W 28/0252; H04W 28/0268; H04W 28/0875; H04W 72/1263; H04W 72/569; H04W 92/18; H04W 80/02; H04W 72/12; H04L 43/106; H04L 5/00; H04L 5/0053; H04L 5/0094; H04B 17/27; H04B 7/24–7/26
See application file for complete search history.

(56) References Cited

U.S. PATENT DOCUMENTS

| | | | | |
|---|---|---|---|---|
| 2017/0048903 | A1* | 2/2017 | Yi | H04W 4/70 |
| 2019/0261450 | A1* | 8/2019 | Adachi | H04W 76/11 |
| 2019/0364586 | A1* | 11/2019 | Li | H04W 72/23 |
| 2020/0163005 | A1* | 5/2020 | Rao | H04W 4/46 |
| 2020/0296619 | A1* | 9/2020 | Pan | H04W 76/14 |
| 2020/0344771 | A1* | 10/2020 | Kang | H04W 28/0263 |
| 2021/0014887 | A1* | 1/2021 | Lou | H04L 5/0064 |
| 2021/0068126 | A1* | 3/2021 | Lou | H04W 28/0268 |
| 2021/0105790 | A1* | 4/2021 | Lin | H04W 74/004 |
| 2021/0144580 | A1* | 5/2021 | Alfarhan | H04W 72/23 |
| 2021/0144727 | A1* | 5/2021 | Pan | H04W 4/40 |
| 2021/0266953 | A1* | 8/2021 | Pelletier | H04W 72/569 |
| 2021/0306913 | A1* | 9/2021 | Li | H04W 76/36 |
| 2022/0132603 | A1* | 4/2022 | Adjakple | H04W 8/005 |
| 2022/0295334 | A1* | 9/2022 | Sun | H04W 72/543 |

OTHER PUBLICATIONS

PCT/CN2019/125224 English translation of International Search Report dated Sep. 16, 2020, 2 pages.
Catt: "LCP Procedure for NR Sidelink", 3GPP Draft; R2-1903173, Apr. 2019, 3 pages.
Catt: "LCP Procedure for NR Sidelink", 3GPP Draft; R2-1905801, May 2019, 4 pages.
Russian Patent Application No. 2022118461, Office Action dated Mar. 30, 2023, 8 pages.
Russian Patent Application No. 2022118461, English translation of Office Action dated Mar. 30, 2023, 7 pages.
Japanese Patent Application No. 2022-535773, Office Action dated Mar. 28, 2023, 6 pages.
Japanese Patent Application No. 2022-535773, English translation of Office Action dated Mar. 28, 2023, 2 pages.
LG Electronics "[Running CR] Introduction of 5G V2X with NR Sidelink" 3GPP TSG-RAN WG2 Meeting #108, R2-1916120, Nov. 2019, 4 pages.
LG Electronics "[Running CR] Introduction of 5G V2X with NR Sidelink" 3GPP TSG-RAN WG2 Meeting #108, R2-1916030, Nov. 2019, 5 pages.
Zte et al. "Further discussion on sidelin RLC AM and UM for unicast" 3GPP TSG-RAN WG2 Meeting #108, R2-1914547, Nov. 2019, 7 pages.
3rd Generation Partnership Project; Technical Specification Group Radio Access Network; Evolved Universal Terrestrial Radio Access (E-UTRA);Medium Access Control (MAC) protocol specification(Release 15) Sep. 2019, 134 pages.
European Patent Application No. 19955457.7, Search and Opinion dated Aug. 8, 2023, 11 pages.
Session Chair (Samsung) "Report from session on Lte V2X and Nr V2X" 3GPP TSG-RAN WG2 Meeting #108, R2-1916288, Nov. 2019, 37 pages.

* cited by examiner

METHOD FOR PROCESSING DATA, COMMUNICATION DEVICE, AND STORAGE MEDIUM

CROSS-REFERENCE TO RELATED APPLICATION

This application is a U.S. national phase of International Application No. PCT/CN2019/125224, filed on Dec. 13, 2019, the entire content of which is incorporated herein by reference.

TECHNICAL FIELD

The disclosure relates to the field of wireless communication, and in particular, to a method for processing data, a communication device and a storage medium.

BACKGROUND

In the fourth generation ($4^{th}$, 4G) mobile communication era, a sidelink (SL) communication mode was introduced to support a direct communication between a user equipment (UE) and another UE. A protocol stack of the SL communication mode can be illustrated in FIG. 1. An interface between UE A and UE B is PC5-U. Addressing for the SL transmission is realized through a source identifier and a destination identifier of a media access control (MAC) layer and there is no need to establish a connection before the transmission. There is only a data radio bearer (DRB) on the SL for transmitting data and each DRB corresponds to a logical channel. A plurality of logical channels can be established between a source UE and a destination UE for transmitting data. The layers included in UE A and UE B in FIG. 1 are a physical layer (PHY), a MAC layer, a radio link control (RLC) and a packet data convergence protocol (PDCP).

In the fifth generation ($5^{th}$, 5G) mobile communication era, a unicast connection on the SL is necessary to support enhanced vehicle-to-everything (V2X) communications and other services, and to provide higher transmission rate and higher reliability. To support the establishment and management of unicast connections, an SL signaling radio bearer (SRB) is introduced to transmit control signalings for establishing and managing unicast connections. Each SRB also corresponds to a logical channel. When a network configures logical channel priorities by broadcasting, logical channel priorities of logical channels corresponding to DRB(s) and SRB(s) may be fixed values. Data on each logical channel may change dynamically. In the related art, it may happen that data of the lower logical channel priority of the destination UE are transmitted, but data of the higher logical channel priority of another destination UE are not transmitted, which may not guarantee Quality of Service (QoS).

SUMMARY

A method for processing data is provided according to a first aspect of the disclosure, which is applicable to a first UE and includes: determining a second UE based on logical channel priorities of logical channels corresponding to SL-DRBs and/or SL-SRBs of data to be transmitted; and determining a medium-access-control protocol data unit (MAC PDU) for transmitting to the second UE, in which the MAC PDU includes data to be transmitted in one or more sidelink radio bearers (SL-RBs) determined based on logical channel priorities of logical channels corresponding to SL-RBs of the second UE, and the SL-RBs of the second UE include SL-DRB(s) of the second UE and/or SL-SRB(s) of the second UE.

A UE is provided according to a second aspect of the disclosure, which includes: a transceiver; a memory; and a processor, respectively connected to the transceiver and the memory, configured to control the transceiver to transmit and receive wireless signals and perform the method as described in any solution of the first aspect by executing computer-executable instructions stored in the memory.

A computer storage medium storing computer-executable instructions is provided according to a third aspect of the disclosure. When the computer-executable instructions are executed by a processor, the method as described in any solution of the first aspect is performed.

DETAILED DESCRIPTION

Figure 1:
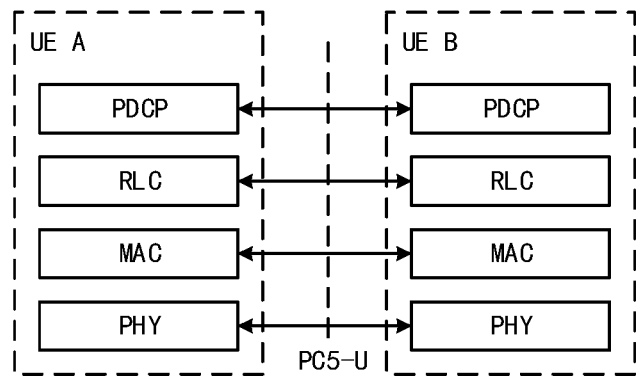
FIG. 1 is a schematic diagram illustrating a protocol stack of SL communication.
Figure 2:
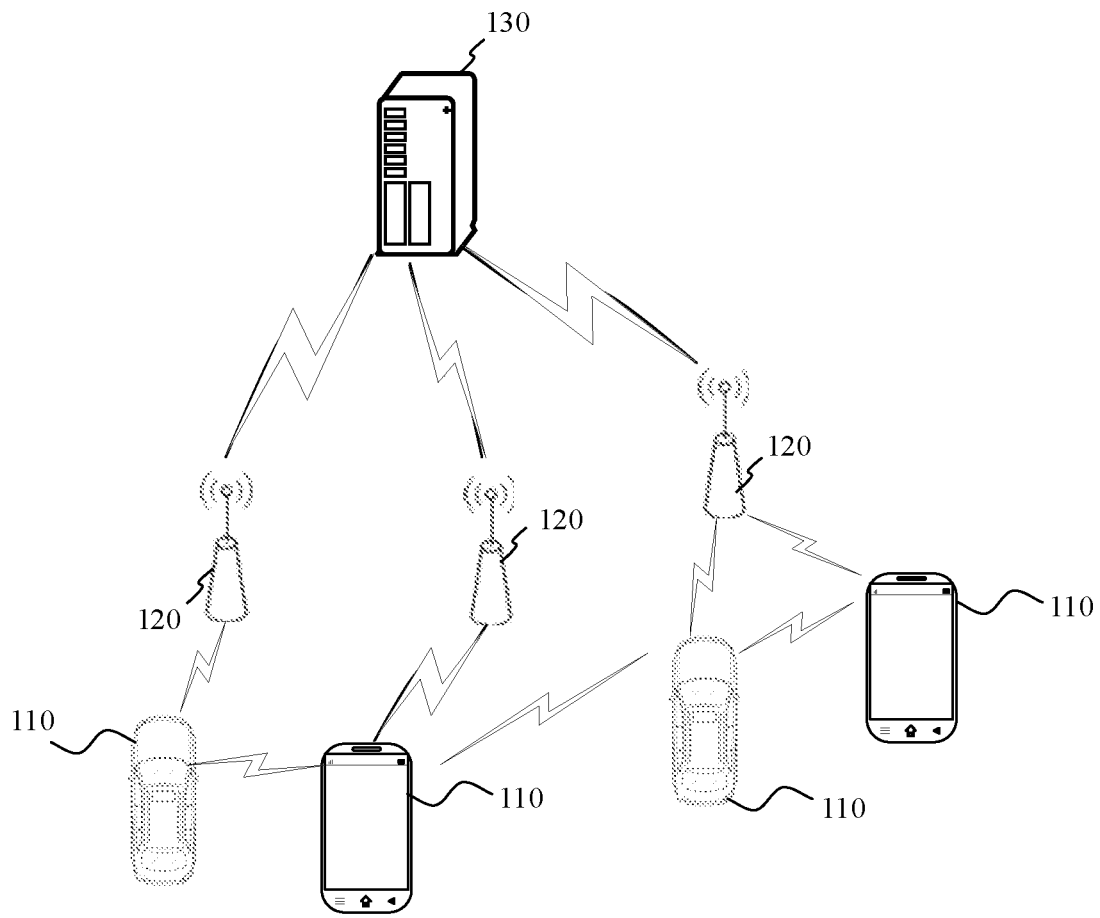
FIG. 2 is a schematic diagram of a wireless communication system according to some examples of the disclosure.

Referring to FIG. 2, it illustrates a schematic diagram of a wireless communication system according to some examples of the disclosure. As illustrated in FIG. 2, the wireless communication system is a communication system based on cellular mobile communication technologies. The wireless communication system may include terminals 110 and base stations 120.

The terminal 110 may be a device that provides voice and/or data connectivity to a user. The terminal 110 can communicate with one or more core networks via a radio access network (RAN). The terminal 110 can be an IoT terminal such as a sensor device, a mobile phone (or a cellular phone) and a computer with the IoT terminal such as a fixed, portable, pocket-sized, handheld, built-in computer or vehicle-mounted device, for example, station (STA), subscriber unit, subscriber station, mobile station, mobile, remote station, access point, remote terminal, access terminal, user terminal, user agent, user device, or user equipment (UE). Alternatively, the terminal 110 may also be an unmanned aircraft. Alternatively, the terminal 110 may also be an in-vehicle device, for example, a trip computer having a wireless communication function or a wireless communication device connected to the trip computer. Alternatively, the terminal 110 may also be a roadside device, for example, a street lamp, a signal lamp or other roadside device having the wireless communication function.

The base station 120 may be a network side device in the wireless communication system. The wireless communication system may be the 4$^{th}$ generation mobile communication (4G) system, also known as the long-term evolution (LTE) system. The wireless communication system may also be the 5$^{th}$ generation mobile communication (5G) system, also known as the new radio (NR) system or 5G NR system. Alternatively, the wireless communication system may also be a next-generation system of the 5G system. The access network in the 5G system can be called the new generation-radio access network (NG-RAN).

The base station 120 may be an evolved base station (eNB) adopted in the 4G system. Alternatively, the base station 120 may also be a base station (gNB) adopting a centralized and distributed architecture in the 5G system. When the base station 120 adopts the centralized distributed architecture, it usually includes a central unit (CU) and at least two distributed units (DUs). The CU is provided with a packet data convergence protocol (PDCP) layer, a radio link control (RLC) layer and a protocol stack having a media access control (MAC) layer. The DU is provided with a protocol stack having a physical (PHY) layer. The example of the disclosure does not limit the specific implementation manner of the base station 120.

A wireless link can be established between the base station 120 and the terminal 110 through a wireless air interface. In different examples, the wireless air interface is a wireless air interface based on the 4G standard. Alternatively, the wireless air interface is a wireless air interface based on the 5G standard, for example, the wireless air interface is a NR. The wireless air interface can also be a wireless air interface based on a standard of next generation mobile communication network technology based on the 5G standard.

In some examples, an end to end (E2E) link may also be established between the terminals 110, for example, a vehicle to vehicle (V2V) communication, a vehicle to infrastructure (V2I) communication and a vehicle to pedestrian (V2P) communication in a vehicle to everything (V2X) communication.

In some examples, the above wireless communication system may also include a network management device 130.

The base stations 120 are coupled to the network management device 130 respectively. The network management device 130 may be a core network device in the wireless communication system. For example, the network management device 130 may be a mobility management entity (MME) of an evolved packet core (EPC). Alternatively, the network management device may also be other core network devices, such as a serving gateway (SGW), a public data network gateway (PGW), a policy and charging rules function (PCRF) unit or a home subscriber server (HSS). The implementation form of the network management device 130 is not limited in the examples of the disclosure.

Figure 3:
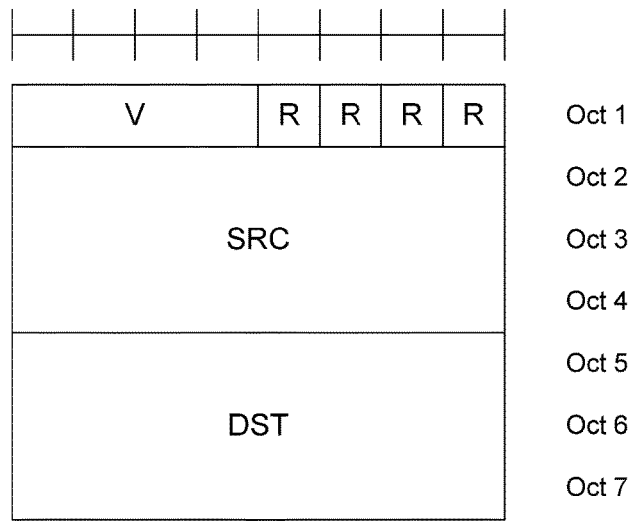
FIG. 3 is a schematic diagram of a MAC SL-SCH according to some examples of the disclosure.

Addressing for the SL transmission is realized through a source identifier and a destination identifier carried in a MAC SL-SCH sub-header. There is no need to establish a connection before the transmission. A structure of the MAC SL-SCH sub-header is illustrated in FIG. 3. SRC is a layer 2 identifier of a source UE and DST is a layer 2 identifier of a destination UE. The layer 2 identifier is generated by an application layer and provided to an AS layer to identify a UE that performs SL transmission.

Figure 4:
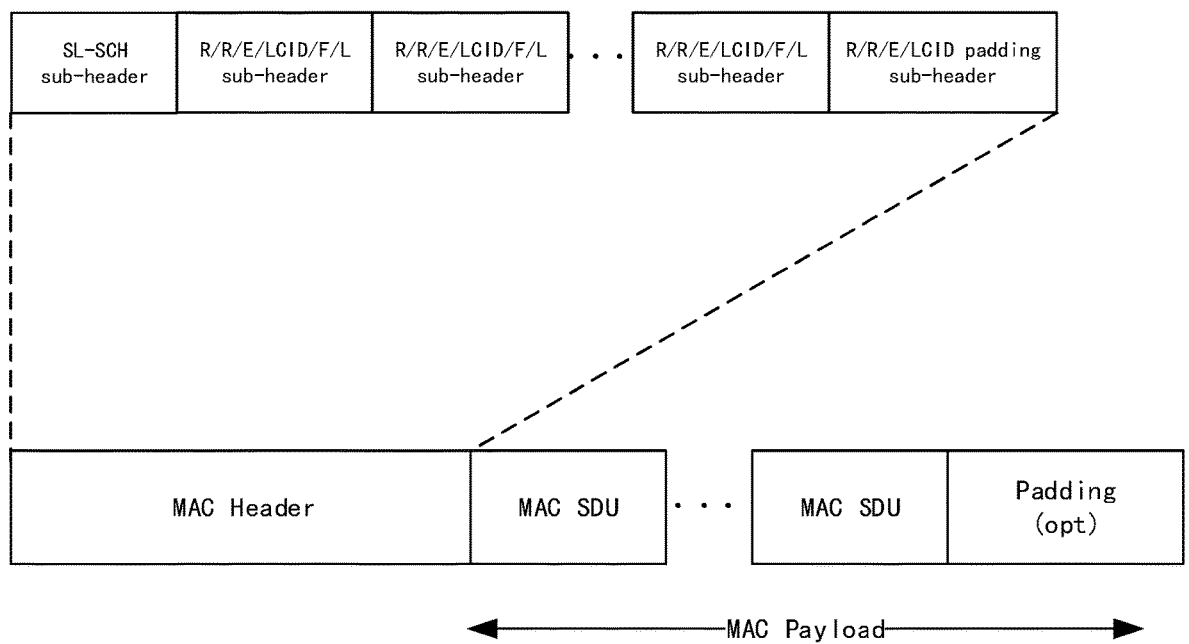
FIG. 4 is a schematic diagram of a MAC PDU according to some examples of the disclosure.

As illustrated in FIG. 4, each MAC PDU can only be transmitted to one destination UE. Each MAC PDU includes only one MAC header. The MAC header includes only one MAC SL-SCH sub-header. The structure of the SL-SCH sub-header can be illustrated in FIG. 3. V in FIG. 3 represents a version of the MAC SL-SCH. R represents a reserved field in the MAC SL-SCH. Oct means a byte. The MAC SL-SCH in FIG. 3 includes 7 bytes.

The meaning of each field in the MAC PDU sub-header in FIG. 4 is as follows.

LCID is a logical channel identifier.

L indicates a length of a corresponding MAC service data unit (SDU) or a corresponding MAC control unit, in bytes.

F indicates a length of the L field.

E indicates whether there are more fields following the MAC header.

R is reserved bits.

An order of the MAC PDU sub-headers is consistent with an order of corresponding MAC SDUs, the MAC control unit and padding. The MAC control unit precedes all MAC SDUs.

Padding is located at the end of the MAC PDU. The padding can be any value. The UE ignores the padding and allows 0 or more padding bytes.

In the fifth generation (5$^{th}$, 5G) mobile communication era, a unicast connection on the SL is necessary to support the enhanced V2X and other services and provide the higher transmission rate and higher reliability. To support the establishment and management of unicast connections, a SL SRB is introduced to transmit control signalings for establishing and managing unicast connections. Each SRB also corresponds to a logical channel.

Each logical channel (LCH) has a logical channel priority for logical channel scheduling. This logical channel priority is configured by the network. The network configures a UE in a connected state through a dedicated signaling and configures a UE in an idle state through broadcasting. The network configures the logical channel priority for this logical channel according to QoS of data carried by the logical channel.

When the UE receives a SL grant, the UE selects to transmit data through the following logical channel prioritization (LCP).

Step 1: a logical channel with a highest logical channel priority is selected and data to be transmitted in this logical channel are put into the MAC PDU.

Step 2: a logical channel with a highest logical channel priority is selected from other logical channels of a destination UE to which the logical channel selected in step 1 belongs and data to be transmitted in this logical channel are put into the MAC PDU.

Until data to be transmitted in all logical channels of the destination UE are put into the MAC PDU or the SL grant has been unable to put more data, the MAC PDU is submitted to a physical layer for transmission.

On a Uu interface, the UE selects the logical channel data to put into the MAC PDU through a token bucket algorithm. The network may configure the following parameters for each logical channel: a logical channel priority and a prioritized bit rate (the unit is bit/s). The UE maintains a bucket capacity (Bj, in bits) for each logical channel. The logical channel priority is initially 0. Whenever the UE obtains a grant, the logical channel priority of each logical channel is increased by "the prioritized bit rate*a duration of the grant", and the logical channel priority of each logical channel may not exceed "the prioritized bit rate*the bucket capacity".

When the UE receives the SL grant, the UE selects to transmit data through the following logical channel prioritization (LCP).

In all logical channels with the bucket capacity>0, data in the bucket capacity size in each logical channel are put into the MAC PDU based on an order of the logical channel priorities from high to low.

The amount of data put into the MAC PDU is subtracted from the bucket capacity of the logical channel.

If it may continue to transmit data after 1 and 2, data in each logical channel are transmitted into the MAC PDU based on an order of the logical channel priorities from high to low, regardless of the bucket capacity.

According to the current link control protocol (LCP) process, when the logical channel priority of the DRB is lower than the logical channel priority of the SRB, the UE will preferentially select the logical channel corresponding to the SRB, and data of the other logical channels of the corresponding destination UE are put into the MAC PDU for transmitting.

Figure 5:
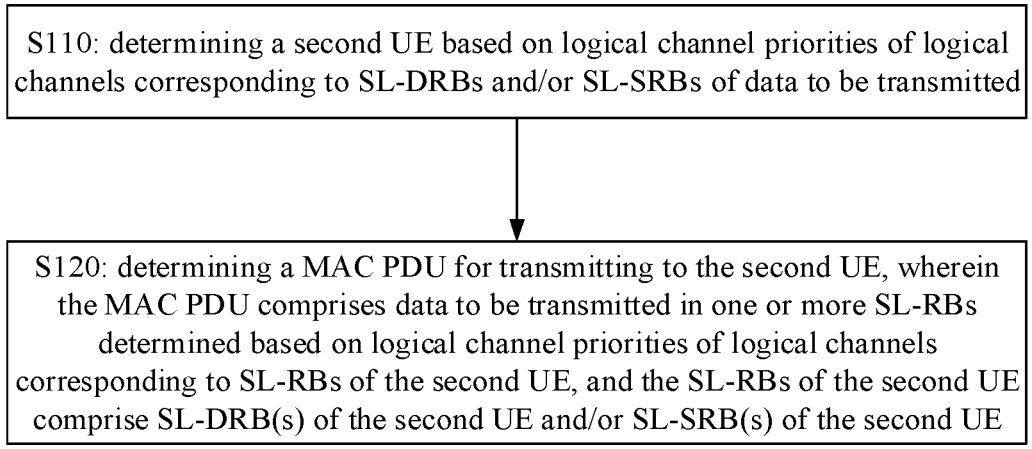
FIG. 5 is a flowchart of a method for processing data according to some examples of the disclosure.

As illustrated in FIG. 5, some examples provide a method for processing data. The method is applicable to a first UE. The method includes the following.

S110: a second UE is determined based on logical channel priorities of logical channels corresponding to SL-DRBs and/or SL-SRBs of data to be transmitted.

S120, a MAC PDU for transmitting to the second UE is determined. The MAC PDU includes data to be transmitted in one or more SL-RBs determined based on logical channel priorities of logical channels corresponding to SL-RBs of the second UE, and the SL-RBs of the second UE include SL-DRB(s) of the second UE and/or SL-SRB(s) of the second UE.

In some examples of the disclosure, when there are multiple SL-RBs of the data to be transmitted in the UE, the first UE can only transmit one MAC PDU one time and one MAC PDU can only carry an identifier of one receiving UE, a destination UE that first receives data transmitted by the first UE, that is, the second UE, is determined based on the logical channel priorities of the logical channels corresponding to the SL-DRBs and/or the SL-SRBs in the SL-RBs.

The SL-RB may be divided into the SL-DRB and the SL-SRB. Data in the SL-SRB are generally a control signaling. The control signaling can include various information for SL establishment and/or maintenance between the first UE and the second UE.

The SL-RB herein may be a SL radio bearer and data to be transmitted in the SL-RB are data that need to be transmitted through the SL. In some cases, data transmitted through SL may be referred to as SL data.

Data included in the SL-DRB are service data that the first UE needs to transmit to the second UE, which is a purpose of establishing the SL between the first UE and the second UE. Generally, the higher the logical channel priority of the logical channel corresponding to the SL-DRB, the higher an urgency of transmitting the data included in the SL-DRB. For example, when the first UE and the second UE are in-vehicle devices, the service data transmitted through the SL may be service data related to driving safety or common communication data during driving. At this time, the logical channel priority of the logical channel corresponding to the SL-DRB where the service data related to driving safety is located generally higher than the logical channel priority of the logical channel corresponding to the SL-DRB where the common communication service data is located. However, since the logical channels corresponding to the SL-DRB and the SL-SRB are different, there may be differences in the priorities of the logical channels. If the other UEs that preferentially receive data of the first UE is selected, from high to low, based on the logical channel priorities of the logical channels corresponding to all SL-RBs or the logical channel priorities of the logical channels corresponding to the SL-SRBs, the receiving UE of the SL-DRB corresponding to the lower logical channel priority may be selected to receive the data first, so that the service data related to safe driving is transmitted later than the common communication data, which leads to a phenomena such as safety accidents.

In some examples of the disclosure, in order to reduce this phenomenon, the second UE that preferentially receives data transmitted by the first UE is determined based on the logical channel priorities of the logical channels corresponding to the SL-DRBs. For example, determining the second UE based on the logical channel priorities of the logical channels corresponding to the SL-DRBs and/or the SL-SRBs of the data to be transmitted includes the following. The data to be transmitted are determined. A receiving UE corresponding to a SL-DRB with a highest logical channel priority is selected as the second UE based on the logical channel priorities of the logical channels corresponding to the SL-DRBs, in response to the data to be transmitted including the SL-DRBs. In this way, it can be ensured that other UE that has a demand for receiving high-urgency service data will preferentially receive data transmitted by the first UE to satisfy the QoS of the high-urgency service data. A receiving UE corresponding to a SL-SRB with a highest logical channel priority is selected as the second UE based on the logical channel priorities of the logical channels corresponding to the SL-SRBs, in response to the data to be transmitted not including the SL-DRBs but including the SL-SRBs.

After the second UE is determined, the MAC PDU is generated based on data to be transmitted in SL-DRB(s) and/or SL-SRB(s) corresponding to the second UE, and the MAC PDU may carry data to be transmitted in one or more SL-RBs.

When there are multiple SL-RBs to be transmitted to the second UE, in S120, data may be filled into the MAC PDU for transmitting to the second UE based on the logical channel priorities of the logical channels corresponding to the SL-RBs to be transmitted to the second UE from high to low, thus ensuring that the SL-RB with the higher logical channel priority may be preferentially transmitted to the second UE.

In some examples, the logical channel corresponding to the SL-DRB has a logical channel identifier and the logical channel identifier is defined by a communication protocol or configured by a network side.

If the logical channel identifier of the logical channel is defined by the communication protocol, the logical channel identifier is written into the first UE when the first UE leaves the factory.

Configuring by the network side may include configuring by an access network and/or a core network. The network elements of the access network may at least include a base station. The network elements of the core network may include such as an access management function (AMF). The network elements of the access network and the network elements of the core network are examples and the implementation is not limited to this.

For example, a logical channel set is configured for logical channels allocated to SL-DRBs and one or more logical channels in the logical channel set are indicated by a corresponding logical channel identifier. When configuring the logical channel of the SL-DRB, one can be selected from the logical channel set and configured to the corresponding SL-DRB.

For example, a logical channel with a logical channel priority matching an urgency of data included in the SL-DRB is selected and configured to the SL-DRB.

In some examples of the disclosure, the data to be transmitted are determined. If the data to be transmitted include the SL-DRBs, a receiving UE of a SL-DRB with a highest logical channel priority is selected as the second UE based on the logical channel priorities of the logical channels corresponding to the SL-DRBs.

In some examples of the disclosure, there are various implementation manners for determining the second UE based on the logical channel priorities of the logical channels corresponding to the SL-DRBs of the data to be transmitted. Examples are provided below for illustration.

Figure 6A:
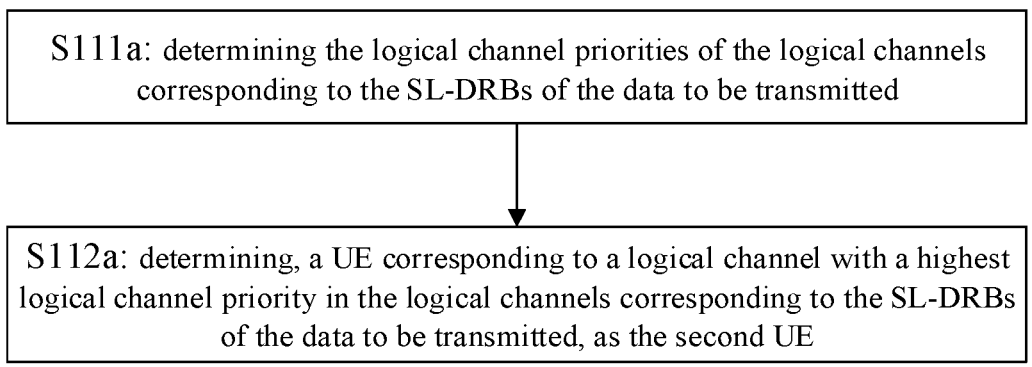
FIG. 6A is a flowchart of a method for processing data according to some examples of the disclosure.

In one or more examples, as illustrated in FIG. 6A, determining the second UE based on the logical channel priorities of the logical channels corresponding to the SL-DRBs of the data to be transmitted may include the following.

S111a: the logical channel priorities of the logical channels corresponding to the SL-DRBs of the data to be transmitted are determined.

S111a: a UE corresponding to a logical channel with a highest logical channel priority in the logical channels corresponding to the SL-DRBs of the data to be transmitted, is determined as the second UE.

At this time, the second UE selected is the UE with the highest logical channel priority of the logical channels corresponding to all the SL-DRBs.

Figure 6B:
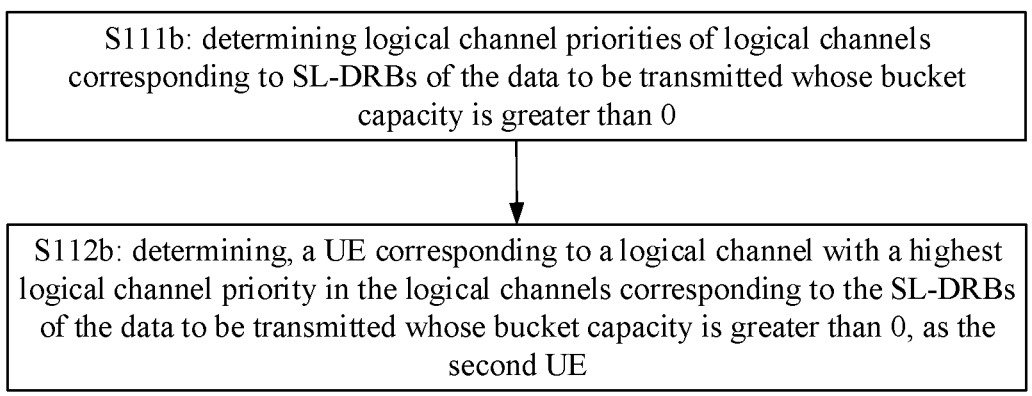
FIG. 6B is a flowchart of a method for processing data according to some examples of the disclosure.

In other examples, as illustrated in FIG. 6B, determining the second UE based on the logical channel priorities of the logical channels corresponding to the SL-DRBs of the data to be transmitted may include the following.

S111b: logical channel priorities of logical channels corresponding to SL-DRBs of the data to be transmitted whose bucket capacity is greater than 0, are determined.

S112b: a UE corresponding to a logical channel with a highest logical channel priority in the logical channels corresponding to the SL-DRBs of the data to be transmitted whose bucket capacity is greater than 0, is determined as the second UE.

In some examples of the disclosure, the first UE configures a token bucket and a bucket capacity of the token bucket for each logical channel, so as to ensure that each logical channel can be polled and thus mapped to a transmission channel of a physical layer for data transmission.

In some examples of the disclosure, the logical channels with the bucket capacity greater than 0 are selected first, one with the highest logical channel priority is selected among the logical channels with the bucket capacity greater than 0, and the receiving UE of the SL-DRB corresponding to the logical channel with the highest logical channel priority in the logical channels with the bucket capacity greater than 0 is the second UE.

It is assumed that the first UE is configured with M logical channels, there are the N logical channels with the bucket capacity currently greater than 0, and N is less than or equal to M. When N is less than M, the SL-DRB corresponding to at least one logical channel does not participate in the logical channel prioritization. For example, M is equal to 4, the bucket capacity of logical channel 1 to logical channel 3 is greater than 0, and the capacity of logical channel 4 is equal to 0 or less than 0. At this time, logical channel 4 does not participate in the logical channel prioritization. If, at this time, SL-DRB1 is configured on logical channel 4, SL-DRB2 is configured on logical channel 3, the logical channel priority of logical channel 4 is higher than the logical channel priority of logical channel 3, and the logical channel priority of logical channel 3 is higher than the logical channel priority of logical channel 1 and the logical channel priority of logical channel 2, respectively, the receiving UE of SL-DRB2 corresponding to logical channel 3 is still selected as the second UE, instead of selecting the receiving UE of SL-DRB1 corresponding to the logical channel with the higher priority as the second UE.

In a word, the introduction of the bucket capacity of the bucket token makes it necessary to preferentially exclude logical channels whose bucket capacity is equal to or less than 0 when determining the second UE in step S110, and then the determination of the second UE is made based on logical channel priorities of logical channels whose bucket capacity is greater than 0. Therefore, in some cases, the range for determining the SL-DRB of the second UE in solution two is smaller than the range for determining the SL-DRB of the second UE in solution one, but solution two can ensure that every logical channel is polled.

In some examples of the disclosure, the data to be transmitted are determined. If the data to be transmitted include the SL-SRBs and do not include the SL-DRBs, a receiving UE of a SL-SRB with a highest logical channel priority based on the logical channel priorities of the SL-SRBs. In some examples of the disclosure, there may be various manners for determining the second UE based on the SL-SRBs, for example, reference may be made to the manners based on the SL-DRBs, which is not limited in some examples of the disclosure.

Of course, in some examples of the disclosure, the data to be transmitted are determined, and if the data to be transmitted include both the SL-DRBs and the SL-SRBs, a receiving UE of a SL-DRB with a highest logical channel priority is used as the second UE based on the logical channel priorities of the logical channels corresponding to the SL-DRBs.

After the second UE is determined, there are also multiple ways to determine the MAC PDU, and two multiple implementation ways are provided below.

In some examples, the MAC PDU for transmitting to the second UE is determined. The MAC PDU includes data to be transmitted in one or more SL-RBs determined based on logical channel priorities of logical channels corresponding to SL-RBs of the second UE, and the SL-RBs of the second UE include SL-DRB(s) of the second UE and/or SL-SRB(s) of the second UE. It may include the following.

S121a: the logical channel priorities of the logical channels corresponding to the SL-RBs of the second UE are determined.

S122a: data to be transmitted in one or more SL-RBs are determined based on an order of the logical channel priorities from high to low.

S123a: the MAC PDU for transmitting to the second UE is determined based on the data to be transmitted in the one or more SL-RBs.

Figure 7A:
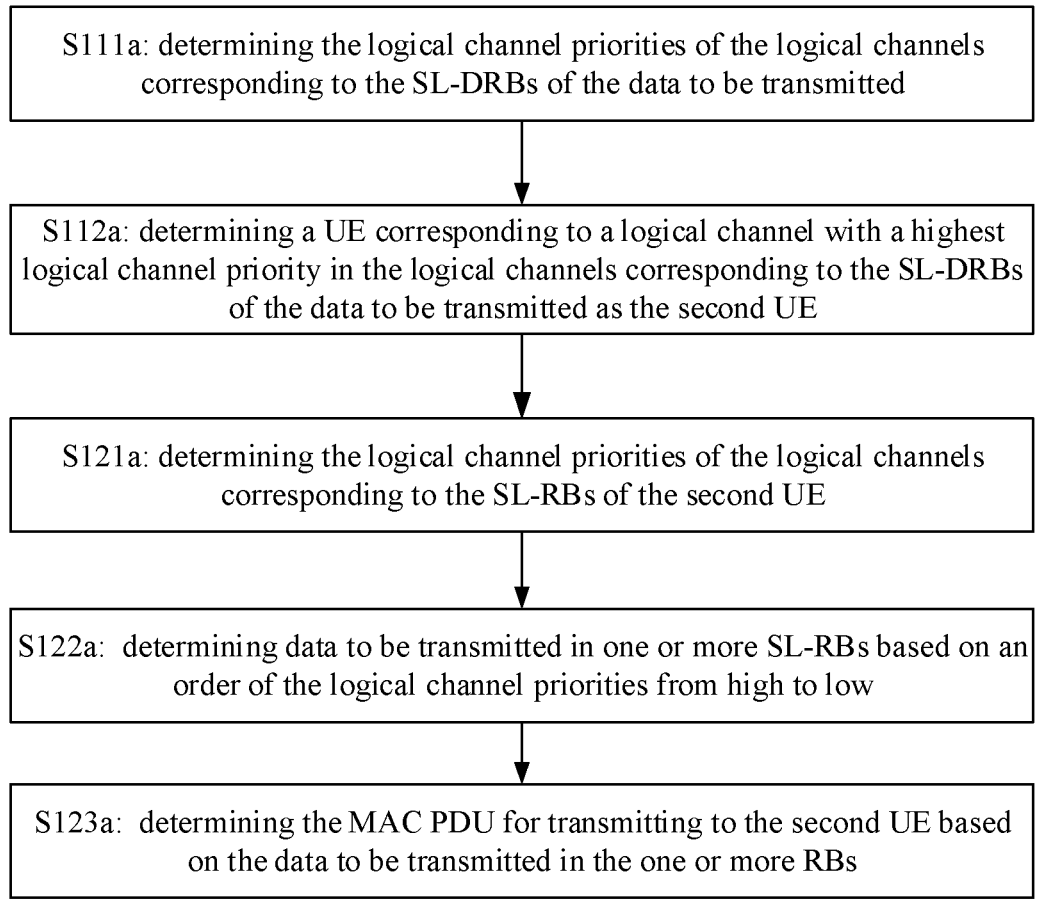
FIG. 7A is a flowchart of a method for processing data according to some examples of the disclosure.

As illustrated in FIG. 7A, if optional manner 1 is applied, the method in examples of the disclosure may include the following.

S111a: the logical channel priorities of the logical channels corresponding to the SL-DRBs of the data to be transmitted are determined.

S112a: a UE corresponding to a logical channel with a highest logical channel priority in the logical channels corresponding to the SL-DRBs of the data to be transmitted is determined as the second UE.

S121a: the logical channel priorities of the logical channels corresponding to the SL-RBs of the second UE are determined.

S122a: data to be transmitted in one or more SL-RBs are determined based on an order of the logical channel priorities from high to low.

S123a: the MAC PDU for transmitting to the second UE is determined based on the data to be transmitted in the one or more RBs.

In this manner, the MAC PDU is directly generated based on the logical channel priorities of the logical channels corresponding to all SL-RBs of the second UE. For example, the MAC PDU is filled based on the order of the logical channel priorities of the logical channels corresponding to the SL-RBs of the second UE from high to low.

Optional manner 2, in some examples, the MAC PDU for transmitting to the second UE is determined. The MAC PDU includes data to be transmitted in one or more SL-RBs determined based on logical channel priorities of logical channels corresponding to SL-RBs of the second UE, and the SL-RBs of the second UE include SL-DRB(s) of the second UE and/or SL-SRB(s) of the second UE. It may include the following.

S121b: logical channel priorities of logical channels corresponding to SL-RBs of the second UE whose bucket capacity is greater than 0 are determined.

S122b: data to be transmitted in one or more SL-RBs are determined based on an order of the logical channel priorities from high to low.

S123b: the MAC PDU for transmitting to the second UE is determined based on the data to be transmitted in the one or more SL-RBs.

In some examples of the disclosure, according to the token bucket algorithm, the MAC PDU may be filled based on the logical channel priorities of the SL-RBs with the bucket capacity greater than 0, that are selected first, of the second UE, thereby ensuring that the data included in the SL-RB with the capacity greater than 0 and the highest logical channel priority are transmitted first.

In some examples, the S122b further includes: in response to data to be transmitted in the SL-RBs of the second UE whose bucket capacity is greater than 0 being all carried in the MAC PDU and the MAC PDU still having a remaining capacity, determining data to be transmitted in one or more SL-RBs based on an order of logical channel priorities of logical channels corresponding to SL-SBs of the second UE from high to low; and determining the MAC PDU for transmitting to the second UE based on the data to be transmitted in the one or more SL-RBs.

Figure 7B:
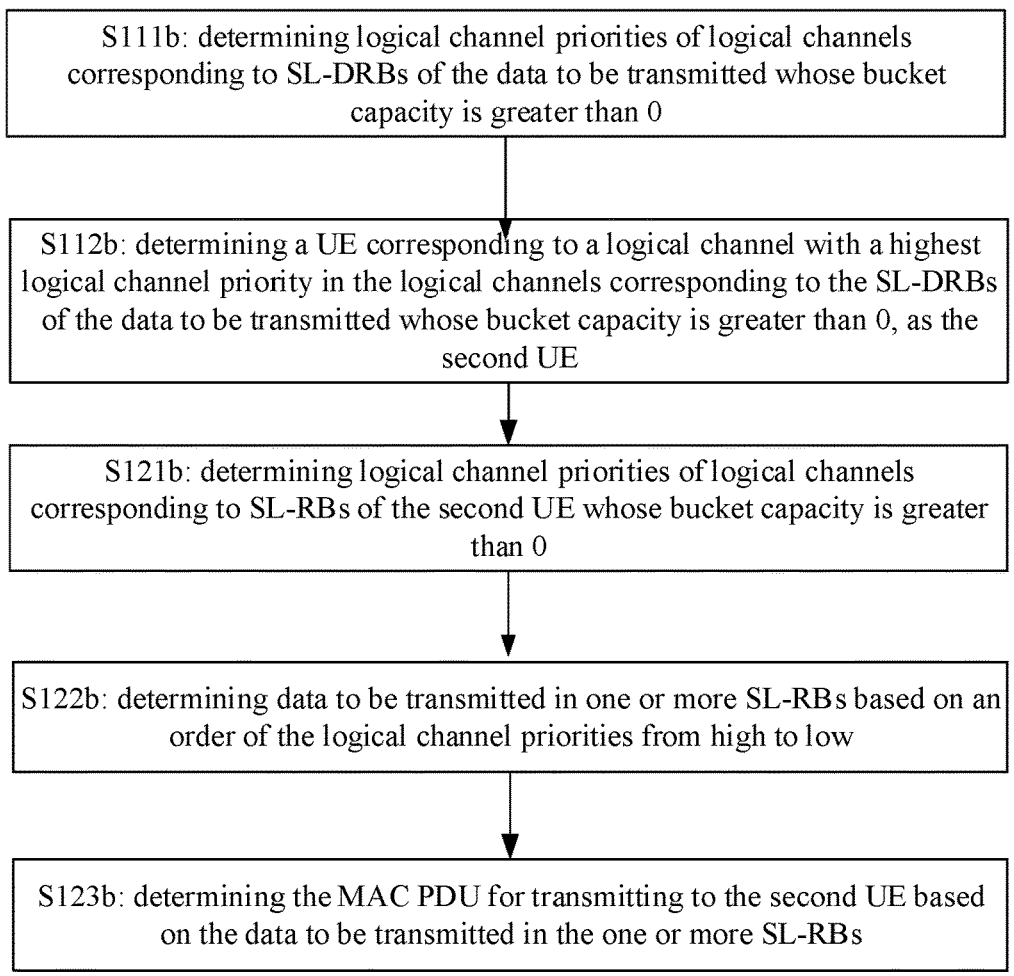
FIG. 7B is a flowchart of a method for processing data according to some examples of the disclosure.

In other examples, as illustrated in FIG. 7B, the method in examples of the disclosure may include the following.

S111b: logical channel priorities of logical channels corresponding to SL-DRBs of the data to be transmitted whose bucket capacity is greater than 0 are determined.

S112b: a UE corresponding to a logical channel with a highest logical channel priority in the logical channels corresponding to the SL-DRBs of the data to be transmitted whose bucket capacity is greater than 0, is determined as the second UE.

S121b: logical channel priorities of logical channels corresponding to SL-RBs of the second UE whose bucket capacity is greater than 0 are determined.

S122b: data to be transmitted in one or more SL-RBs are determined based on an order of the logical channel priorities from high to low.

S123b: the MAC PDU for transmitting to the second UE is determined based on the data to be transmitted in the one or more SL-RBs.

That is, when a number of logical channels corresponding to the SL-RBs of the second UE, in which the bucket capacity is greater than 0, is relatively small or a data volume of each SL-RB is relatively small, all SL-RBs with the bucket capacity greater than 0 are carried in the MAC PDU. If the MAC PDU has the remaining capacity, the data in all SL-RBs of the second UE can be filled into the MAC-PDU. To ensure that the data in the SL-RB with the higher logical channel priority is transmitted first, the MAC PDU may still be filled with data from high to low according to the logical channel priorities.

In other examples, when data to be transmitted in the SL-RBs of the second UE whose bucket capacity is greater than 0 are all carried in the MAC PDU and the MAC PDU still has the remaining capacity, a SL-SB of the second UE for transmitting data may be randomly selected. The data to be transmitted of the randomly selected SL-SB is filled into the corresponding MAC PDU.

In some examples, the MAC SL-SCH sub-header of the MAC PDU includes an SL layer (Layer, L) 2 identifier of the second UE.

The SL L identifier of the MAC SL-SCH sub-header of the MAC PDU is carried in the SL-SCH for other UEs that detect the MAC PDU to determine whether the currently received MAC PDU is transmitted to itself.

Figure 8:
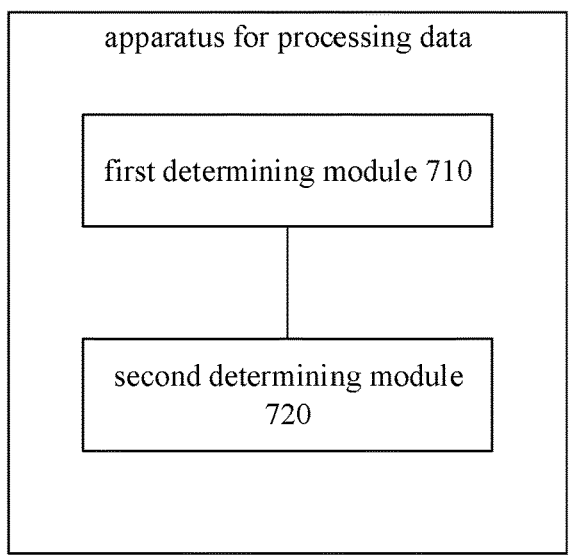
FIG. 8 is a block diagram of an apparatus for processing data according to some examples of the disclosure.

As illustrated in FIG. 8, some examples provide an apparatus for processing data, which is applicable to a first user equipment UE and includes: a first determining module 710 configured to determine a second UE based on logical channel priorities of logical channels corresponding to SL-DRBs and/or SL-SRBs of data to be transmitted; and a second determining module 720 configured to determine a MAC PDU for transmitting to the second UE, in which the MAC PDU includes data to be transmitted in one or more SL-RBs determined based on logical channel priorities of logical channels corresponding to SL-RBs of the second UE, and the SL-RBs of the second UE include SL-DRB(s) of the second UE and/or SL-SRB(s) of the second UE.

In some examples, the first determining module 710 and the second determining module 720 may be program modules; and after the program modules are executed by the processor, the determination of the second UE and the MAC PDU can be implemented.

In other examples, the first determining module 710 and the second determining module 720 may be a combination of software and hardware; the combination of software and hardware may include various programmable arrays; and the programmable arrays may include field programmable arrays and/or complex programmable arrays.

In still other examples, the first determining module 710 and the second determining module 720 may be pure hardware modules; and the pure hardware modules may include application specific integrated circuits.

In some examples, the logical channel corresponding to the SL-DRB has a logical channel identifier and the logical channel identifier is defined by a communication protocol or configured by a network side.

In some examples, the first determining module 710 is configured to determine the data to be transmitted, and determine the second UE based on the logical channel priorities of the logical channels corresponding to the SL-DRBs in response to SL-RBs of the data to be transmitted including the SL-DRBs.

In some examples, the first determining module 710 is configured to determine the logical channel priorities of the logical channels corresponding to the SL-DRBs of the data to be transmitted; and determine, a UE corresponding to a logical channel with a highest logical channel priority in the logical channels corresponding to the SL-DRBs of the data to be transmitted, as the second UE.

In some examples, the first determining module 710 is configured to determine logical channel priorities of logical channels corresponding to SL-DRBs of the data to be transmitted whose bucket capacity is greater than 0; determine, a UE corresponding to a logical channel with a highest logical channel priority in the logical channels corresponding to the SL-DRBs of the data to be transmitted whose bucket capacity is greater than 0, as the second UE.

In some examples, the first determining module is configured to determine the second UE based on the logical channel priorities of the logical channels corresponding to the SL-SRBs in response to SL-RBs of the data to be transmitted not including the SL-DRBs but including the SL-SRBs.

In some examples, the second determining module 720 is configured to determine the logical channel priorities of the logical channels corresponding to the SL-RBs of the second UE; determine data to be transmitted in one or more SL-RBs based on an order of the logical channel priorities from high to low; and determine the MAC PDU for transmitting to the second UE based on the data to be transmitted in the one or more SL-RBs.

In some examples, the second determining module 720 is configured to determine logical channel priorities of logical channels corresponding to SL-RBs of the second UE whose bucket capacity is greater than 0; determine data to be transmitted in one or more SL-RBs based on an order of the logical channel priorities from high to low; and determine the MAC PDU for transmitting to the second UE based on the data to be transmitted in the one or more SL-RBs.

In some examples, the second determining module 720 is further configured to, in response to data to be transmitted in the SL-RBs of the second UE whose bucket capacity is greater than 0 being all carried in the MAC PDU and the MAC PDU still having a remaining capacity, determine data to be transmitted in one or more SL-RBs based on an order of logical channel priorities of logical channels corresponding to SL-SBs of the second UE from high to low; and determine the MAC PDU for transmitting to the second UE based on the data to be transmitted in the one or more SL-RBs.

In some examples, a MAC SL-SCH sub-header of the MAC PDU includes an SL layer 2 identifier of the second UE.

Several specific examples are provided below in conjunction with any of the above-mentioned examples.

Example 1

When a network configures logical channel priorities by broadcasting, logical channel priorities of logical channels corresponding to DRB(s) and SRB(s) may be fixed values. Data on each logical channel may change dynamically. According to the current LCP process, when the logical channel priority of the DRB is lower than the logical channel priority of the SRB, the UE may preferentially select the logical channel corresponding to the SRB, and data of other logical channels of a destination UE are put into the MAC PDU and transmitted. It may happen that data of the lower logical channel priority of the destination UE are transmitted, but data of the higher logical channel priority of another destination UE are not transmitted, which may not guarantee Quality of Service (QoS).

When the UE MAC receives a SL grant, it selects a logical channel with a highest logical channel priority in logical channels corresponding to DRBs of the data to be transmitted or logical channels corresponding to DRBs with a capacity greater than 0 of the data to be transmitted and a layer 2 identifier of the corresponding destination UE is selected.

In all logical channels corresponding to the selected layer 2 identifier, data to be transmitted in logical channels may be put into the MAC PDU based on a token bucket algorithm or the logical channel priorities, until the data to be transmitted in all logical channels are put into the MAC PDU or no more data can be placed in the MAC PDU.

Example 2

UEx has established a connection with UE1, a layer 2 identifier of UE1 is 000, and the following logical channels are configured for data to be received by UE1. UEx herein is the aforementioned first UE.

SL-SRB1, corresponding to LCH0, the logical channel priority is 1;
SL-SRB2, corresponding to LCH1, the logical channel priority is 3;
SL-DRB1, corresponding to LCH2, the logical channel priority is 0; and
SL-DRB2, corresponding to LCH3, the logical channel priority is 2.

UEx has established a connection with UE2, a layer 2 identifier of UE2 is 001, and the following logical channels are configured for data to be received by UE2.

SL-SRB1, corresponding to LCH5, the logical channel priority is 4;
SL-SRB2, corresponding to LCH6, the logical channel priority is 1;
SL-DRB1, corresponding to LCH7, the logical channel priority is 1; and
SL-DRB2, corresponding to LCH8, the logical channel priority is 3.

When UEx receives an SL grant of 1 k bits, it has data to be transmitted on the following logical channels:

LCH1 has 0.1 k bits of data to be transmitted;
LCH3 has 0.3 k bits of data to be transmitted;
LCH5 has 0.4 k bits of data to be transmitted;
LCH7 has 0.2 k bits of data to be transmitted; and
LCH8 has 0.6 k bits of data to be transmitted.

The MAC layer of the UE identifies logical channels corresponding to SL-DRBs to be transmitted as LCH3, LCH7 and LCH8, and LCH8 with the highest logical channel priority is selected and UE2 is selected. UE2 selected herein is the aforementioned second UE that is selected to receive data preferentially.

The MAC layer of the UE identifies logical channels of UE2 that have data to be transmit, as LCH5, LCH7 and LCH8. LCH5 and LCH8 are put into the MAC PDU in sequence according to the priorities of the logical channels and it may find that no more data can be put into, then the MAC PDU is submitted to the physical layer and transmitted to UE2.

Example 3

UEx has established a SL with UE1, a layer 2 identifier of UE1 is 000, and the following logical channels are configured for data to be transmitted to UE1. UEx herein is the aforementioned first UE.

SL-SRB1, corresponding to LCH0, the logical channel priority is 1;
SL-SRB2, corresponding to LCH1, the logical channel priority is 3;
SL-DRB1, corresponding to LCH2, the logical channel priority is 0; and
SL-DRB2, corresponding to LCH3, the logical channel priority is 2.

UEx has established a connection with UE2, a layer 2 identifier of UE2 is 001, and the following logical channels are configured for data to be transmitted to UE2:
SL-SRB1, corresponding to LCH5, the logical channel priority is 4;
SL-SRB2, corresponding to LCH6, the logical channel priority is 1;
SL-DRB1, corresponding to LCH7, the logical channel priority is 1; and
SL-DRB2, corresponding to LCH8, the logical channel priority is 3.

When UEx receives an SL grant of 10 k bits, it has data to be transmitted on the following logical channels:
LCH1 has 1 k bits of data to be transmitted, and the bucket capacity is 1 k bits;
LCH3 has 3 k bits of data to be transmitted, and the bucket capacity is 1 k bits;
LCH5 has 4 k bits of data to be transmitted, and the bucket capacity is 4 k bits;
LCH7 has 2 k bits of data to be transmitted, and the bucket capacity is 4 k bits;
LCH8 has 6 k bits of data to be transmitted, and the bucket capacity is −5 k bits.

The MAC layer of the UE identifies logical channels corresponding to SL-DRBs to be transmitted as LCH3, LCH7 and LCH8, and logical channels whose bucket capacity is greater than 0 are LCH3 and LCH7. LCH3 with the highest logical channel priority is selected and UE1 is selected. UE1 selected herein is the aforementioned second UE that is selected to receive data preferentially.

The MAC layer of the UE identifies the logical channel of the data to be transmitted with the bucket capacity greater than 0, of UE1 is LCH3. According to the logical channel priority, the 3 k bits of LCH3 are first put into the MAC PDU, then the 1 k bits of LCH1 are put into the MAC PDU, and finally the MAC PDU is delivered to the physical layer and transmitted to UE2.

Figure 9:
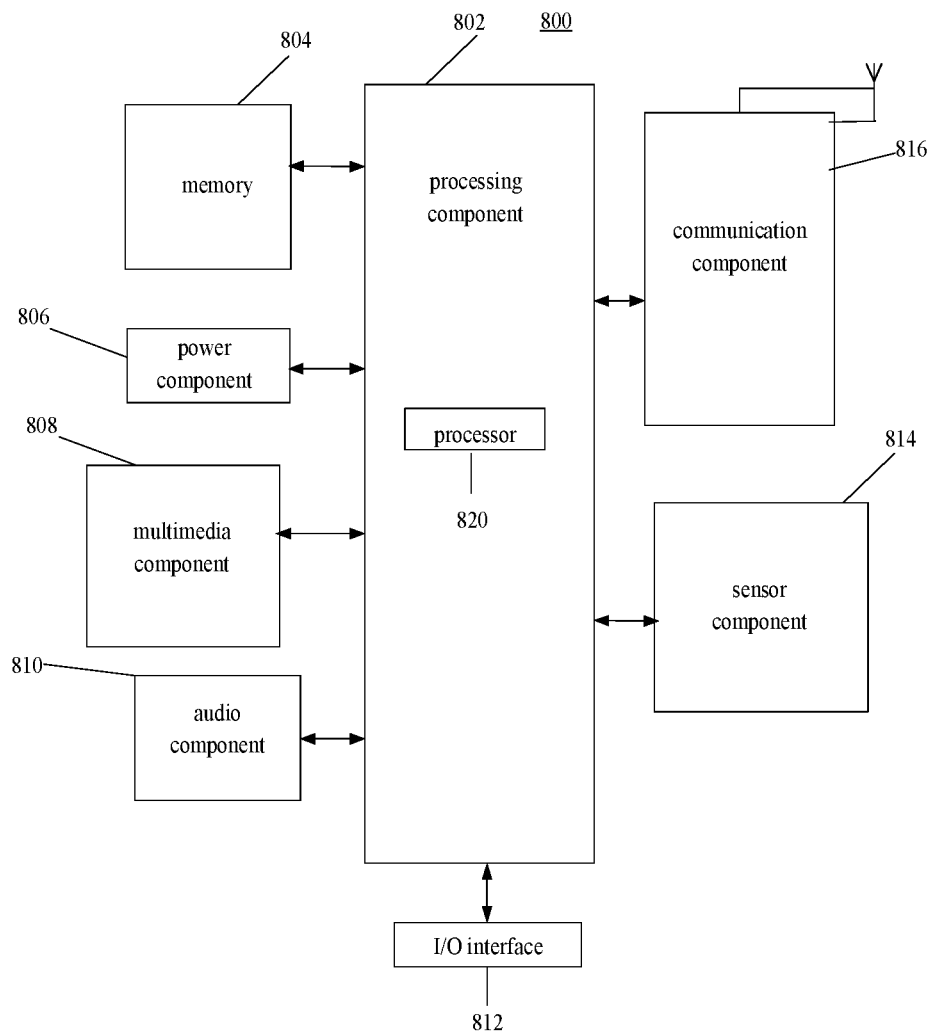
FIG. 9 is a block diagram of a UE according to some examples of the disclosure.

FIG. 9 is a block diagram illustrating a terminal according to some examples. For example, the terminal may be a mobile phone, a computer, a digital broadcast terminal, a messaging device, a gaming console, a tablet, a medical device, exercise equipment, a personal digital assistant, and the like.

Referring to FIG. 9, the terminal 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal 800, such as the operations associated with display, telephone calls, data communications, camera operations, and recording operations. The processing component 802 may include one or more processors 820 to execute instructions to perform all or part of the actions in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal 800. Examples of such data include instructions for any applications or methods operated on the terminal 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 806 may include a power management system, one or more power sources, and any other components associated with the generation, management, and distribution of power in the terminal 800.

The multimedia component 808 includes a screen providing an output interface between the terminal 800 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some examples, the multimedia component 808 includes a front camera and/or a rear camera. The front camera and the rear camera may receive an external multimedia datum while the terminal 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the terminal 800 is in an operation mode, such as a call mode, a recording mode, and a voice recognition mode. The received audio signal may be further stored in the memory 804 or transmitted via the communication component 816. In some examples, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the terminal 800. For instance, the sensor component 814 may detect an open/closed status of the terminal 800, relative positioning of components, e.g., the display and the keypad, of the terminal 800, a change in position of the terminal 800 or a component of the terminal 800, a presence or absence of user contact with the terminal 800, an orientation or an acceleration/deceleration of the terminal 800, and a change in temperature of the terminal 800. The sensor component 814 may include a proximity sensor configured to detect the presence of nearby objects without any physical contact. The sensor component 814 may also include a light sensor, such as a CMOS or CCD image sensor, for use in imaging applications. In some examples, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal 800 and other devices. The terminal 800 can access a wireless network based on a communication standard, such as WiFi, 2G, or 3G, or a combination thereof. In one example, the communication component 816 receives a broadcast signal or broadcast associated information from an external broadcast management system via a broadcast channel. In one example, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some examples, the terminal 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some examples, there is also provided a non-transitory computer-readable storage medium including instructions, such as included in the memory 804, executable by the processor 820 in the terminal 800, for performing the above-described methods. For example, the non-transitory computer-readable storage medium may be a ROM, a RAM, a CD-ROM, a magnetic tape, a floppy disc, an optical data storage device, and the like.

Figure 10:
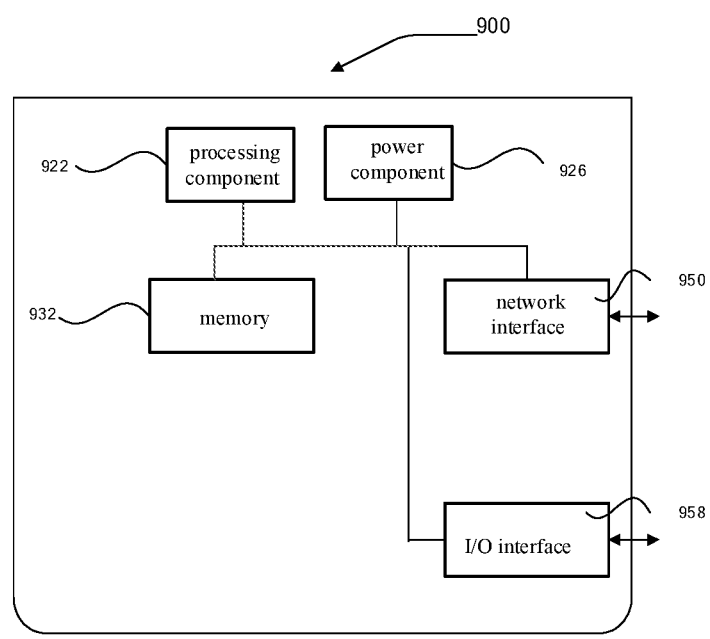
FIG. 10 is a block diagram of a base station according to some examples of the disclosure.

FIG. 10 is a block diagram illustrating a base station according to some examples. Referring to FIG. 10, the base station 900 may include a processing component 922 which further includes one or more processors, and a memory resource represented by a memory 932 for storing instructions such as an application program that can be executed by the processing component 922. The application program stored in the memory 932 may include one or more modules each corresponding to a set of instructions. In addition, the processing component 922 is configured to execute instructions to perform the above-mentioned methods.

The base station 900 may also include a power component 926 configured to perform power management of the base station 900, a wired or wireless network interface 950 configured to connect the base station 900 to a network, and an input/output (I/O) interface 958. The base station 900 can operate based on an operating system stored in the memory 482, such as Windows Server™, Mac OS X™, Unix™, Linux™, FreeBSD™ or the like.

A communication device is provided in examples of the disclosure. The communication device can be a terminal or a base station. The communication device includes: a transceiver; a memory; and a processor, respectively connected to the transceiver and the memory, configured to control the transceiver to transmit and receive wireless signals and perform the method as described in any example described above by executing computer-executable instructions stored in the memory, such as the method as described in FIG. 5, FIG. 6A, FIG. 6B, FIG. 7A and FIG. 7B.

A non-transitory computer-readable storage medium is provided in examples of the disclosure. The non-transitory computer-readable storage medium has stored therein computer-executable instructions. When the computer-executable instructions are executed by a processor, the method as described in any example described above is performed, such as the method as described in FIG. 5, FIG. 6A, FIG. 6B, FIG. 7A and FIG. 7B.

The technical solutions provided by examples of the disclosure may include the following beneficial effects. The second UE that receives data is determined based on the logical channel priorities of the logical channels corresponding to the SL-DRBs and/or the SL-SRBs in the SL-RBs of the data to be transmitted. Therefore, the UE that is determined based on the logical channel priorities of the logical channels corresponding to the SL-DRBs preferentially receives data, thereby reducing a phenomenon where the UE corresponding to the SL-SRB with the lower logical channel priority preferentially receives data when the UE that receives data is selected based on the logical channel priorities of the logical channels corresponding to the SL-SRBs, and improving QoS of transmitting the SL data by the first UE.

Other examples of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only.

It will be appreciated that the disclosure is not limited to the exact construction that has been described above and illustrated in the accompanying drawings, and that various modifications and changes can be made without departing from the scope thereof.

What is claimed is:

1. A method for processing data, for a first user equipment (UE), comprising:
   determining a second UE for receiving data from the first UE, based on logical channel priorities of logical channels corresponding to at least one of sidelink data radio bearers (SL-DRBs) and sidelink signaling radio bearers (SL-SRBs) of data to be transmitted; and
   determining a medium-access-control protocol data unit (MAC PDU) for transmitting to the second UE,
   wherein the MAC PDU comprises data to be transmitted in one or more sidelink radio bearers (SL-RBs) determined based on logical channel priorities of logical channels corresponding to SL-RBs of the second UE, and the SL-RBs of the second UE comprise at least one of SL-DRB(s) of the second UE and SL-SRB(s) of the second UE;
   wherein determining the second UE for receiving data from the first UE based on the logical channel priorities of the logical channels corresponding to the SL-DRBs and/or the SL-SRBs of the data to be transmitted comprises:
   determining the second UE for receiving data from the first UE based on the logical channel priorities of the logical channels corresponding to the SL-DRBs in response to SL-RBs of the data to be transmitted including the SL-DRBs;
   determining the logical channel priorities of the logical channels corresponding to the SL-DRB s of the data to be transmitted; and determining a UE corresponding to a logical channel with a highest logical channel priority in the logical channels corresponding to the SL-DRBs of the data to be transmitted, as the second UE.

2. The method as claimed in claim 1, wherein the logical channel corresponding to the SL-DRB has a logical channel identifier and the logical channel identifier is defined by a communication protocol or configured by a network side.

3. The method as claimed in claim 1, wherein determining the second UE based on the logical channel priorities of the logical channels corresponding to the SL-DRBs comprises:
  determining logical channel priorities of logical channels corresponding to SL-DRBs of the data to be transmitted whose bucket capacity is greater than 0;
  determining a UE corresponding to a logical channel with a highest logical channel priority in the logical channels corresponding to the SL-DRBs of the data to be transmitted whose bucket capacity is greater than 0, as the second UE.

4. The method as claimed in claim 1, wherein determining the second UE based on the logical channel priorities of the logical channels corresponding to the SL-DRBs and/or the SL-SRBs of the data to be transmitted comprises:
  determining the second UE based on the logical channel priorities of the logical channels corresponding to the SL-SRBs in response to SL-RBs of the data to be transmitted not including the SL-DRBs but including the SL-SRBs.

5. The method as claimed in claim 1, wherein determining the MAC PDU for transmitting to the second UE comprises:
  determining the logical channel priorities of the logical channels corresponding to the SL-RBs of the second UE;
  determining data to be transmitted in one or more SL-RBs based on an order of the logical channel priorities from high to low; and
  determining the MAC PDU for transmitting to the second UE based on the data to be transmitted in the one or more SL-RBs.

6. The method as claimed in claim 1, wherein determining the MAC PDU for transmitting to the second UE comprises:
  determining logical channel priorities of logical channels corresponding to SL-RBs of the second UE whose bucket capacity is greater than 0;
  determining data to be transmitted in one or more SL-RBs based on an order of the logical channel priorities from high to low; and
  determining the MAC PDU for transmitting to the second UE based on the data to be transmitted in the one or more SL-RBs.

7. The method as claimed in claim 6, wherein determining the MAC PDU for transmitting to the second UE further comprises:
  in response to data to be transmitted in the SL-RBs of the second UE whose bucket capacity is greater than 0 being all carried in the MAC PDU and the MAC PDU still having a remaining capacity, determining data to be transmitted in one or more SL-RBs based on an order of logical channel priorities of logical channels corresponding to SL-SBs of the second UE from high to low; and
  determining the MAC PDU for transmitting to the second UE based on the data to be transmitted in the one or more SL-RBs.

8. The method as claimed in claim 1, wherein a MAC sidelink shared channel (SL-SCH) sub-header of the MAC PDU comprises an SL layer 2 identifier of the second UE.

9. A first user equipment (UE), comprising:
a transceiver;
a memory; and
a processor, respectively connected to the transceiver and the memory, configured to control the transceiver to transmit and receive wireless signals and perform a method for processing data by executing computer-executable instructions stored in the memory,
wherein the method includes:
determining a second UE for receiving data from the first UE, based on logical channel priorities of logical channels corresponding to at least one of sidelink data radio bearers (SL-DRBs) and sidelink signaling radio bearers (SL-SRBs) of data to be transmitted; and
determining a medium-access-control protocol data unit (MAC PDU) for transmitting to the second UE,
wherein the MAC PDU comprises data to be transmitted in one or more sidelink radio bearers (SL-RBs) determined based on logical channel priorities of logical channels corresponding to SL-RBs of the second UE, and the SL-RBs of the second UE comprise at least one of SL-DRB(s) of the second UE and SL-SRB(s) of the second UE;
wherein determining the second UE for receiving data from the first UE based on the logical channel priorities of the logical channels corresponding to the SL-DRBs and/or the SL-SRBs of the data to be transmitted comprises:
determining the second UE for receiving data from the first UE based on the logical channel priorities of the logical channels corresponding to the SL-DRBs in response to SL-RBs of the data to be transmitted including the SL-DRBs;
determining the logical channel priorities of the logical channels corresponding to the SL-DRB s of the data to be transmitted; and
determining a UE corresponding to a logical channel with a highest logical channel priority in the logical channels corresponding to the SL-DRBs of the data to be transmitted, as the second UE.

10. The UE as claimed in claim 9, wherein the logical channel corresponding to the SL-DRB has a logical channel identifier and the logical channel identifier is defined by a communication protocol or configured by a network side.

11. The UE as claimed in claim 9, wherein determining the second UE based on the logical channel priorities of the logical channels corresponding to the SL-DRBs comprises:
  determining logical channel priorities of logical channels corresponding to SL-DRBs of the data to be transmitted whose bucket capacity is greater than 0;
  determining a UE corresponding to a logical channel with a highest logical channel priority in the logical channels corresponding to the SL-DRBs of the data to be transmitted whose bucket capacity is greater than 0, as the second UE.

12. The UE as claimed in claim 9, wherein determining the second UE based on the logical channel priorities of the logical channels corresponding to the SL-DRBs and/or the SL-SRBs of the data to be transmitted comprises:
  determining the second UE based on the logical channel priorities of the logical channels corresponding to the SL-SRBs in response to SL-RBs of the data to be transmitted not including the SL-DRBs but including the SL-SRBs.

13. The UE as claimed in claim 9, wherein determining the MAC PDU for transmitting to the second UE comprises:

determining the logical channel priorities of the logical channels corresponding to the SL-RBs of the second UE;

determining data to be transmitted in one or more SL-RBs based on an order of the logical channel priorities from high to low; and determining the MAC PDU for transmitting to the second UE based on the data to be transmitted in the one or more SL-RBs.

14. The UE as claimed in claim 9, wherein determining the MAC PDU for transmitting to the second UE comprises:

determining logical channel priorities of logical channels corresponding to SL-RBs of the second UE whose bucket capacity is greater than 0;

determining data to be transmitted in one or more SL-RBs based on an order of the logical channel priorities from high to low; and determining the MAC PDU for transmitting to the second UE based on the data to be transmitted in the one or more SL-RBs.

15. The UE as claimed in claim 14, wherein determining the MAC PDU for transmitting to the second UE further comprises:

in response to data to be transmitted in the SL-RBs of the second UE whose bucket capacity is greater than 0 being all carried in the MAC PDU and the MAC PDU still having a remaining capacity, determining data to be transmitted in one or more SL-RBs based on an order of logical channel priorities of logical channels corresponding to SL-SBs of the second UE from high to low; and determining the MAC PDU for transmitting to the second UE based on the data to be transmitted in the one or more SL-RBs.

16. A non-transitory computer storage medium storing computer-executable instructions, wherein when the computer-executable instructions are executed by a processor, a method for processing data for a first user equipment (UE) is performed, the method comprising:

determining a second UE for receiving data from the first UE, based on logical channel priorities of logical channels corresponding to at least one of sidelink data radio bearers (SL-DRBs) and sidelink signaling radio bearers (SL-SRBs) of data to be transmitted; and determining a medium-access-control protocol data unit (MAC PDU) for transmitting to the second UE, wherein the MAC PDU comprises data to be transmitted in one or more sidelink radio bearers (SL-RBs) determined based on logical channel priorities of logical channels corresponding to SL-RBs of the second UE, and the SL-RBs of the second UE comprise at least one of SL-DRB(s) of the second UE and SL-SRB(s) of the second UE;

wherein determining the second UE for receiving data from the first UE based on the logical channel priorities of the logical channels corresponding to the SL-DRBs and/or the SL-SRBs of the data to be transmitted comprises:

determining the second UE for receiving data from the first UE based on the logical channel priorities of the logical channels corresponding to the SL-DRBs in response to SL-RBs of the data to be transmitted including the SL-DRBs;

determining the logical channel priorities of the logical channels corresponding to the SL-DRB s of the data to be transmitted; and determining a UE corresponding to a logical channel with a highest logical channel priority in the logical channels corresponding to the SL-DRBs of the data to be transmitted, as the second UE.

* * * * *